May 24, 1960   H. B. WHITMORE   2,937,661
COUPLING DEVICE
Filed July 13, 1955
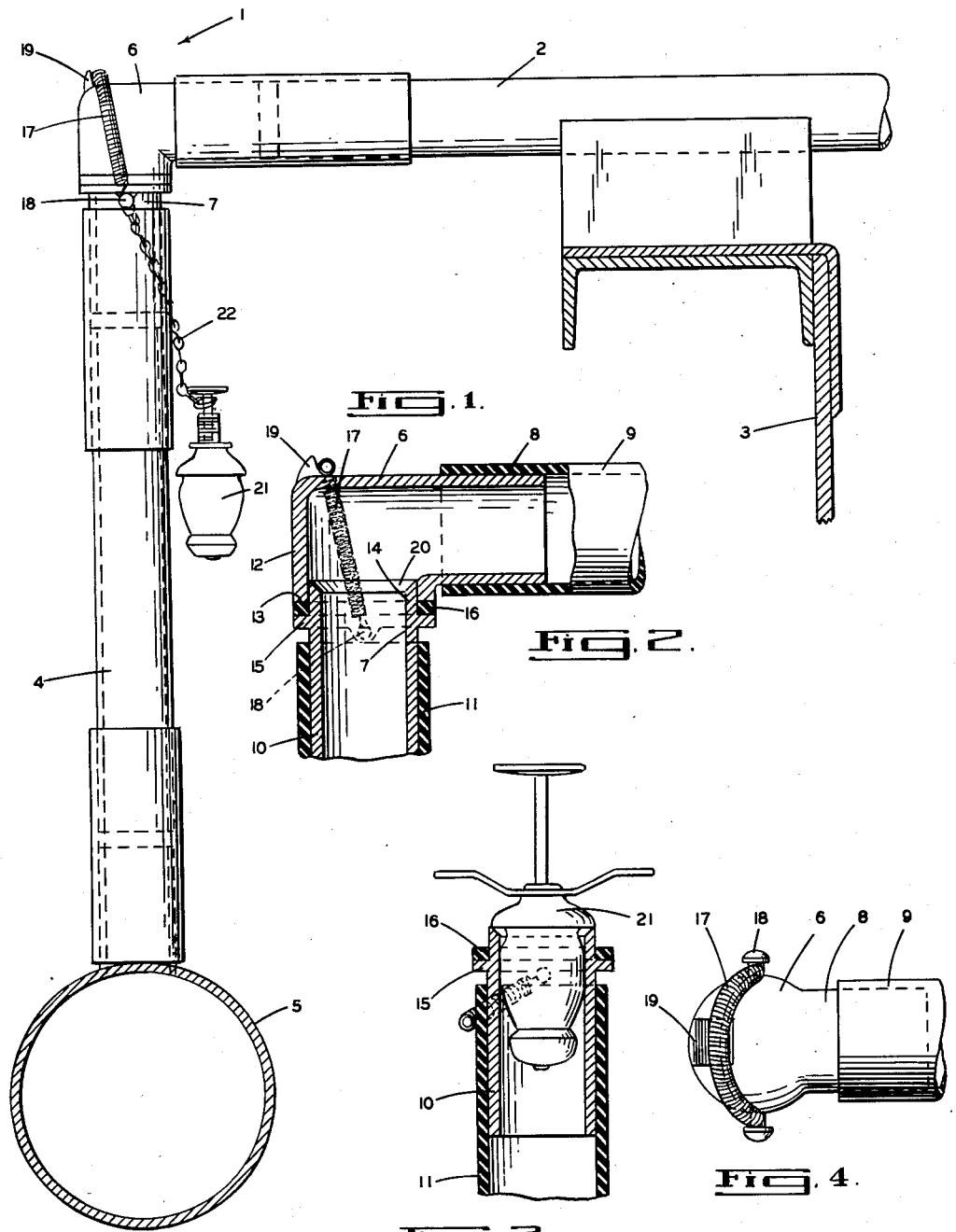
INVENTOR
HORACE B. WHITMORE
ATTY.

United States Patent Office 2,937,661
Patented May 24, 1960

2,937,661
COUPLING DEVICE
Horace B. Whitmore, 530 King St. E., Toronto, Ontario, Canada
Filed July 13, 1955, Ser. No. 521,834
6 Claims. (Cl. 137—565)

This invention relates to improvements in couplings and more particularly to an improved coupling assembly for effecting coupling between a pair of flow passages disposed in substantially right angular relation such as occurs in filtering systems where the normally horizontal top pipes leading from the filter elements of a tank are connected to the main header by vertical branch pipes.

In filter installation of the type above referred to filter elements usually in the form of leaf filters are disposed in a tank and the filtered liquid is withdrawn from the filters under vacuum through normally horizontal lead off or top pipes leading from the top of the tank and connected through suitable elbows, unions, valves and depending branch pipes with a main header which is connected with a vacuum source. When it is desired to remove one of the filter elements for cleaning, replacement, or other purpose, the branch circuit constituted by such element, top pipe, dependent branch pipe and associated fittings is closed off by shutting the valve, and the top pipe and filter element removed by disconnecting at the union. Such installations are expensive from the standpoint of the fittings required, and also the uncoupling of the filter elements is time consuming and inconvenient particularly when the threads of the union become corroded requiring the use of tools which may have to be manipulated in cramped or confined quarters.

It is the object of this invention to greatly facilitate the connection of the filter element and its associated lead off or top pipe to the header branch pipe. More particularly in this connection it is the object of the invention to eliminate any use of tools and to enable coupling and uncoupling of the filter element to be effected in a matter of seconds.

Another important object is to eliminate the present valve structures incorporated in the branch circuit by enabling the branch circuit to be closed off by a simple separable closure.

The principal feature of the invention resides in providing an elbow formation having one arm connected to the filter lead off pipe and its other arm formed with an accurate gasket fitting end surface, and providing on the adjoining end of the header branch pipe a companion piece for the elbow comprising a fitting having a gasket carrying external flange, with which the elbow end surface cooperates, surrounding an accurate annular extension adapted to fit snugly within the elbow end, the elbow and companion piece having interengaging clamping means to secure them in interfitting relation.

Another feature resides in providing an extraneous closure member for seating on the end of the annular extension of the fitting to form a separate shut off valve. In this connection it is a feature of the invention to form the end of the annular extension with a chamfered internal seating surface for cooperation with the extraneous valve and utilizing in addition to any interlock provided by the valve itself with the extension the vacuum applied through the header to seat the valve on the chamfered seating surface.

These and other objects and features will become apparent from the following detailed description taken in conjunction with the accompanying drawings in which:

Figure 1 is a part elevational view, part vertical sectional view showing a coupling embodying the invention connecting the top pipe leading from a filtering device to one of the branches of a main header.

Figure 2 is an enlarged vertical section of the coupling of Figure 1 with the component parts in assembled relation.

Figure 3 is a vertical section of the tube element of the coupling with the elbow removed and illustrating the use of a valve to close off the vacuum system to which the tube element is connected.

Figure 4 is an enlarged top plan view of the coupling with the component parts assembled.

Referring first to Figure 1, a particular application of the present coupling designated generally as 1 is to connect the top pipe 2 of a filter leaf (not shown) which may be submerged in a tank 3 to a vertical branch pipe 4 leading off from the main header 5 connected to a suitable source of vacuum.

In such installations, usually the liquid medium to be filtered which is contained in the tank 3 is drawn through the filtering elements of a large number of filter leaves suspended in the tank with each leaf being connected to the main header 5 through a top pipe 2 and branch pipe 4 with Figure 1 showing the typical arrangement for connecting one particular filter leaf.

As it is necessary to frequently remove the filter leaves for cleaning, any means of facilitating the removal of the filter leaf from the vacuum system and sealing off the system is important. The coupling 1, in accordance with the present invention, comprises an elbow 6 and a tubular companion piece 7. One arm 8 of the elbow 6 is connected through a suitable flexible coupling or sleeve 9 to the top pipe 2 while one end 10 of the companion piece 7 is coupled through a similar sleeve 11 to the branch pipe 4 which may comprise a transparent sight glass.

The second arm 12 of the elbow 6 is formed with an accurate annular end surface 13 adapted to surround the upper end 14 of the tubular companion piece 7, which is snugly and slidably received within the elbow arm 12. The tube 7 is formed adjacent the upper end 14 with an annular flange or shoulder 15 which is disposed contiguous to the annular end surface 13 of the second elbow arm 12. A gasket 16 encircling the upper end 14 of the tube 7 and supported on the annular shoulder 15 is adapted to be compressed between the shoulder and the elbow end surface 13 the gasket being formed of rubber or other suitable compressible material.

With the coupling 1 connected to the vacuum system the application of the vacuum through the main header 5 and branch pipe 4 is such as to urge the end surface 13 of the elbow 6 into firmer engagement with the gasket 16 supported on or backed by the annular shoulder 15. Thus, the action of the vacuum in drawing the parts into tighter assembled relation effects, through the compression of the gasket 16, a seal between the tube and elbow.

To assist in the self-sealing action of the coupling, a spring 17 herein illustrated as a coil spring, secured at the ends to the lugs 18 carried by the tube 7, is adapted to engage over the top of the elbow 6 being held in position by a lug 19. It will be understood that other spring arrangements may be used as desired, but it is to be pointed out that since the use of the spring is to provide additional sealing effects between the coupling components to assist the vacuum seal, a relatively light spring may be employed.

The upper end 14 of the tube 7 is provided with an internal chamfer or bevel 20 which forms an accurate valve seat with which any suitable valve may cooperate to close off the branch pipe 4 when the elbow 6 has been removed or uncoupled from the tube for removing the top pipe 2 and its associated device from the vacuum system. The valve 21 herein illustrated, is a conventional resilient bottle stopper but it will be appreciated that any other form of valve desired may be applied. For convenience, the valve 21 is attached to the coupling by means of a chain 22 connected to one of the lugs 18.

With the coupling 1 connected as shown in Figure 2, it is a simple matter to release the spring 17 by forcing it over the lug 19 and then pulling the telescoped ends of the elbow arm and tube apart, at which time the top pipe 2 is free from the branch pipe 4. The valve 21 is then inserted into position seating on the valve seat 20 being urged into this position under the vacuum in the main header 5 to close off the branch pipe.

It will be understood that various modifications and alterations in the details of the particular coupling disclosed herein as the preferred embodiment of the invention may be made without departing from the scope of the appended claims.

What I claim as my invention is:

1. In a vacuum system, the combination of a tubular elbow and a tubular companion piece, said companion piece being insertable into one end of said elbow and having a peripheral flange adapted to be disposed in opposing relation to said elbow end to grip a gasket interposed between said flange and elbow end, and a source of vacuum for said system for securing said elbow and companion piece in gasket gripping relation.

2. In a vacuum system, the combination of a tubular elbow, a companion piece, and an annular gasket, said elbow having an arm presenting an annular end and said companion piece having an end insertable into said elbow end and presenting an annular surrounding flange on which said gasket is supported with said gasket disposed in opposing relation to said annular elbow end, with said end of said companion piece inserted into said elbow end, and a source of vacuum for said system to clamp said elbow and companion piece together to compress said gasket between said flange and elbow end.

3. In a vacuum system, a connection comprising in combination an elbow and companion piece to form a means of connecting a pair of substantially right angularly disposed pipes in a vacuum system, said elbow having one arm adapted to be connected to one of said pipes and having another right angularly disposed arm formed with an annular end surface, and said companion piece comprising a tubular member having one end adapted to be connected to the other of said pipes and having its other end insertable into said second mentioned elbow arm in snug fitting relation therewith, the insertable end of said tubular member having adjacent the end thereof an external annular gasket supporting shoulder disposed opposite to said annular elbow end surface, means carried by said elbow and companion piece to urge said elbow end surface towards said shoulder, with the companion piece and inserted into said second mentioned elbow arm, and a source of vacuum for said system to clamp said elbow and said companion piece together to compress said gasket and thereby seal said connection.

4. A coupling for a vacuum system for releasably connecting two conduits disposed substantially at right angles comprising an elbow and a tube, one end of said tube being formed to snugly fit within one end of said elbow, a peripheral shoulder formed on said tube adjacent said tube end to be disposed in opposing relation to said elbow end, a compressible gasket encircling said tube end and disposed between and adapted to be compressed by said shoulder and elbow end upon the application of subatmospheric pressures within said coupling and means carried by one and engaging the other of said elbow and tube members to urge said elbow end and tube shoulder towards each other into gasket compressing relation to seal said coupling.

5. In a vacuum system, a vacuum source, a device to be placed under vacuum, and a coupling to be connected between said source and device, said coupling comprising a length of tube having one end connected with said vacuum source, an elbow having one arm connected to said device, and a second arm into which the other end of said tube is snugly received, said second elbow arm having an annular gasket-engaging end and said tube having adjacent said other end a surrounding annular gasket-supporting shoulder disposed contiguous said annular elbow end, a compressible gasket supported on said shoulder and compressed between said annular end and shoulder under application of vacuum to said tube, and means carried by one and releasably engaging the other of said tube and elbow to additionally urge said annular tube end and shoulder into gasket-compressing relation.

6. A device as claimed in claim 5 in which said means to additionally urge said annular tube end and shoulder into gasket compressing relation comprises a resilient member carried by one of said tube and elbow members, and a lug formation carried by the other of said tube and elbow members with which said resilient member releasably cooperates.

References Cited in the file of this patent

UNITED STATES PATENTS

| Re. 4,922 | Robbins | May 28, 1872 |
| 96,945 | Morse | Nov. 16, 1869 |
| 2,021,259 | Magnuson | Nov. 19, 1935 |

FOREIGN PATENTS

| 48,190 | Germany | of 1889 |
| 389,089 | Great Britain | Mar. 6, 1933 |